United States Patent [19]
Xu

[11] Patent Number: 5,848,420
[45] Date of Patent: Dec. 8, 1998

[54] SYSTEM AND METHOD FOR ACCESSING DATA OF A DIGITAL CAMERA FROM A PERSONAL COMPUTER

[75] Inventor: Lin Xu, Carlise, Mass.

[73] Assignee: Eastman Kodak Company, Rochester, N.Y.

[21] Appl. No.: 663,751

[22] Filed: Jun. 14, 1996

[51] Int. Cl.$^6$ .................................................. G06F 17/30
[52] U.S. Cl. ....................... 707/104; 707/205; 707/200; 348/207
[58] Field of Search .................................. 707/104, 205, 707/200, 101; 369/125; 348/207

[56] References Cited

U.S. PATENT DOCUMENTS

| | | | |
|---|---|---|---|
| 4,996,714 | 2/1991 | Desjardins et al. | 382/3 |
| 5,034,804 | 7/1991 | Saski et al. | 348/232 |
| 5,426,747 | 6/1995 | Weinreb et al. | 711/203 |
| 5,432,904 | 7/1995 | Wong | 704/5 |
| 5,504,674 | 4/1996 | Chen et al. | 705/4 |
| 5,528,293 | 6/1996 | Watanabe | 348/231 |
| 5,544,356 | 8/1996 | Robinson et al. | 707/205 |
| 5,640,204 | 6/1997 | Tsutsui | 348/231 |
| 5,689,303 | 11/1997 | Kuroiwa | 348/232 |

OTHER PUBLICATIONS

Epson PhotoPC 700 Digital Camera http://www.zmes.com/oasis/bin/catproduc . . . idx109433.O&acttypex DSR&sourcexbdollar, Dec. 1996.

Kodak DC220 Digital Camera http://www.zones.com/oasis/bin/catproduc . . . idx107764.O&acttypexDSR&sourcex bdollar, Dec. 1996.

*Primary Examiner*—Wayne Amsbury
*Assistant Examiner*—Greta L. Robinson
*Attorney, Agent, or Firm*—Peyton C. Watkins

[57] ABSTRACT

A digital photographic system comprises a digital camera having memory for storing digital images recorded by the camera and a personal computer having a disk operating system and a serial communication port. A software program permits the computer to access the memory in the digital camera through the serial communication port to make the memory appear as a disk to the operating system. The program includes a dynamic file directory for accessing and retrieving a file size from the memory, and a virtual file allocation table for indicating virtual captured image location in the memory computed from the file size retrieved by the dynamic file directory for creating the appearance of a file allocation table, which stores a location of captured datum for ultimately permitting said operating system to access the captured images.

8 Claims, 4 Drawing Sheets

| 120 FILE NAME | DATE & TIME | SIZE | ENTRY POINT IN VIRTUAL FAT |
|---|---|---|---|
| | | | |
| | | | |
| | | | |
| | | | |
| | | | |
| | | | |
| | | | |
| | | | |
| | | | |
| | | | |

FIG. 4

SYSTEM AND METHOD FOR ACCESSING DATA OF A DIGITAL CAMERA FROM A PERSONAL COMPUTER

FIELD OF THE INVENTION

The invention relates generally to the field of digital cameras having memory for storing captured images and, more particularly, to accessing such captured images from a personal computer such that the camera is a virtual disk drive to the computer.

BACKGROUND OF THE INVENTION

A digital camera typically includes an image sensor having an array of picture elements, generally referred to in the art as pixels, that are positioned contiguous to each other. Each pixel functions to form one discrete element of the electronic representation of the image which, when assembled together in the array, forms the total electronic image representation.

The image sensor operates by converting optical energy it receives into separate charge packets at each pixel. The amount of charge that is produced is dependent upon the light level and time of exposure. The charge packets are then read out from each pixel and stored to a storage medium, for example a well known PCMCIA ATA memory card (memory card), or internal memory of the digital camera for later retrieval.

The stored images may then be exported to a personal computer (PC) system for display on its PC monitor, such as for example a typical cathode-ray-tube screen (CRT), or for printing a hardcopy via a printer. For such exporting, the memory card may be inserted into a PCMCIA drive of the personal computer for permitting user interaction. Alternatively, the content of the memory card or internal memory may be downloaded to the personal computer through a serial communication cable by the image manipulation software program. Presently, this is the only method of retrieving images stored in the internal memory.

The images are temporarily stored in random access memory (RAM) by such image manipulation programs during its operation. However, it may be desirable to permanently store the images on either a hard disk of the computer, or a computer-insertable floppy disk. In the case of permanent storage, an operating system (OS) that resides on the computer will create an entry on a disk file directory and then update the file allocation table, FAT. The file directory contains all basic file information such as file name, date and time of creation and location of FAT. The FAT is an indexing system for the OS to indicate the location of each file on the selected disk. Both the file directory and FAT are permanently stored on the particular disk selected, typically a floppy or hard disk.

The file directory and FAT comprise a standard file system used by computers utilizing a "WINDOWS" or DOS-based OS for indexing each particular data file to a storage location, and in the present case, it indexes the location of each data file representing a recorded image.

Although the presently known and utilized system and method for retrieving images from a digital camera are satisfactory, they are not without shortcomings. First and foremost, most desk-top personal computers do not have a PCMCIA drive, and in this case, access through the serial port is the only means of retrieving images. In either case, the recorded images are received by the image manipulation software program in compressed form from the camera, and are de-compressed by the software for permitting either display, user manipulation or printing. For permanently storing the images, the images are either compressed again for minimizing memory storage size or stored in decompressed form. However, this recompression, if it uses a well known lossy compression method for obtaining a higher compression ratio, can cause further loss of detail, and if the image is not re-compressed, a large portion of memory space is obviously consumed for storage.

Consequently, a need exists for improvements in the construction and mode of operating a computer system that retrieves data from a digital camera for overcoming the above-described drawbacks.

SUMMARY OF THE INVENTION

The present invention is directed to overcoming one or more of the problems set forth above. Briefly summarized, according to one aspect of the present invention, the invention resides in a digital photographic system comprising (a) a digital camera having a memory for storing digital images recorded by the camera; (b) a personal computer having an operating system and a serial communication port; (c) means for accessing the memory in the digital camera through the serial communication port to make the memory in the digital camera appear as a disk to the operating system; said accessing means including a dynamic file directory for accessing and retrieving a file size from the memory, and a virtual file allocation table for indicating a virtual recorded image location determined from the file size retrieved by the dynamic file directory for creating the appearance of a file allocation table which stores a location of recorded datum for ultimately permitting said operating system to access the recorded images.

It is an object of the present invention to provide a software program which simulates a file system which includes a virtual FAT for permitting a digital camera to be directly accessed as a disk drive via a computer.

It is also an object of the present invention to provide a means for bypassing the image manipulation software program when retrieving images from a digital camera.

It is a feature of the present invention to provide a virtual file allocation table indicating captured image location determined from the number of captured images and file size retrieved by a dynamic file directory for creating the appearance of a file allocation table which stores a location of recorded datum for ultimately permitting the operating system to access the recorded images The above and other objects of the present invention will become more apparent when taken in conjunction with the following description and drawings wherein identical reference numerals have been used, where possible, to designate identical elements that are common to the figures.

BRIEF DESCRIPTION OF THE DRAWINGS

FIG. 4 is a schematic diagram of a dynamic file directory and virtual file allocation table.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
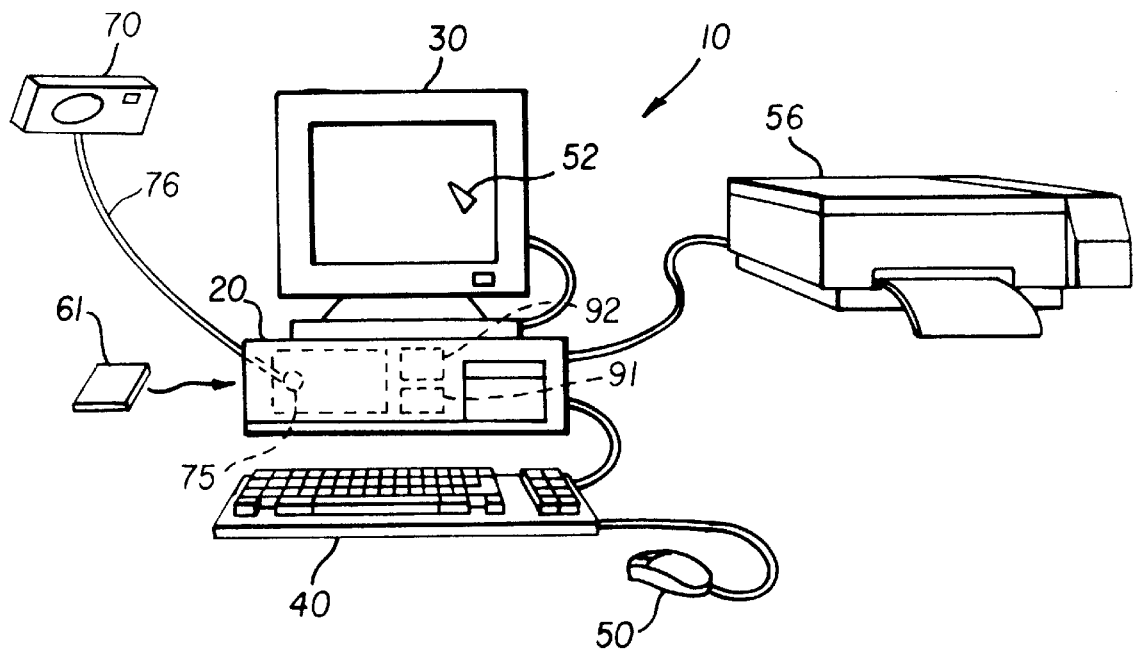
FIG. 1 is a perspective view of a typical computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, however it is preferably used on any "INTEL" 80X86 or compatible processor-based personal computer using DOS or Windows-based operating system. The computer system 10 includes a microprocessor-based unit 20 for receiving and processing software programs and for performing other processing functions. A display 30 is electrically connected to the microprocessor based unit 20 for displaying user related information associated with the software. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A floppy disk 61 is inserted into the microprocessor-based unit 20 as a removable storage device. Still further, the microprocessor-based unit 20 may be programmed, as is well know in the art, for storing the software program internally. A printer 56 is connected to the microprocessor based unit 20 for printing a hardcopy of the output of the computer system 10.

The microprocessor-based unit 20 includes random access memory, generally referred to as RAM 91, for permitting temporary storage of data during operation of the microprocessor-based unit 20, and includes a hard disk 92 for permitting permanent storage of data, as is well known in the art.

Figure 2:
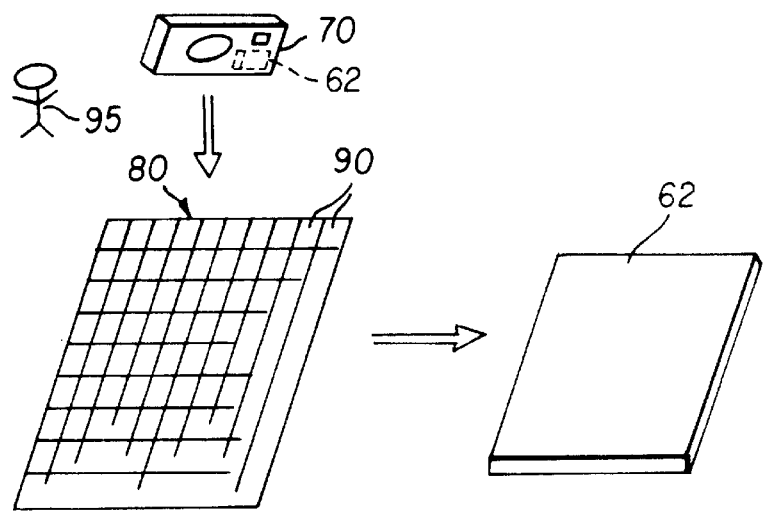
FIG. 2 is a perspective view illustrating the process of capturing an image.

Before proceeding further, it is first instructive to have a basic understanding of the process by which digitized images are typically formed. In this regard, and referring to FIG. 2, a camera 70 includes a charge-coupled device (CCD) 80 having a plurality of pixels 90 for capturing the optical incident image 95. The pixels 90 convert the incident optical energy into a plurality of values, typically ranging from 0–255. The image 95 is then stored electronically on memory 62 of the digital camera 70 for permitting later retrieval by well known computer devices; the memory 62 may be either a removable memory card or permanently mounted memory or both. Each image, in addition to the data representing the image, records in memory its default name for permitting them to be distinguished from each other, data and time of image capture, and a file size corresponding to the memory space used to store the image. Once the memory 62 is completely full, any further capturing of images is precluded until the stored images are erased.

Referring back briefly to FIG. 1, the camera is connected to a serial port 75 of the microprocessor-based unit 20 via a cable 76 for permitting the stored images to be directly accessed by the computer system 10. The microprocessor-based unit 20 includes an operating system in its memory 92 which operating system functions as a central control for instructing the microprocessor-based unit on communicating with software programs and other connected devices, such as disk drives and the camera 70. The operating system is preferable either a DOS-based operating system or a "WINDOWS" based operating system, both of which are well known in the art. The "WINDOWS" based operating system is defined herein as a point and click operating system. It facilitates understanding to note that the serial port equipped camera may be attached and detached during operation of the computer system.

Figure 3:
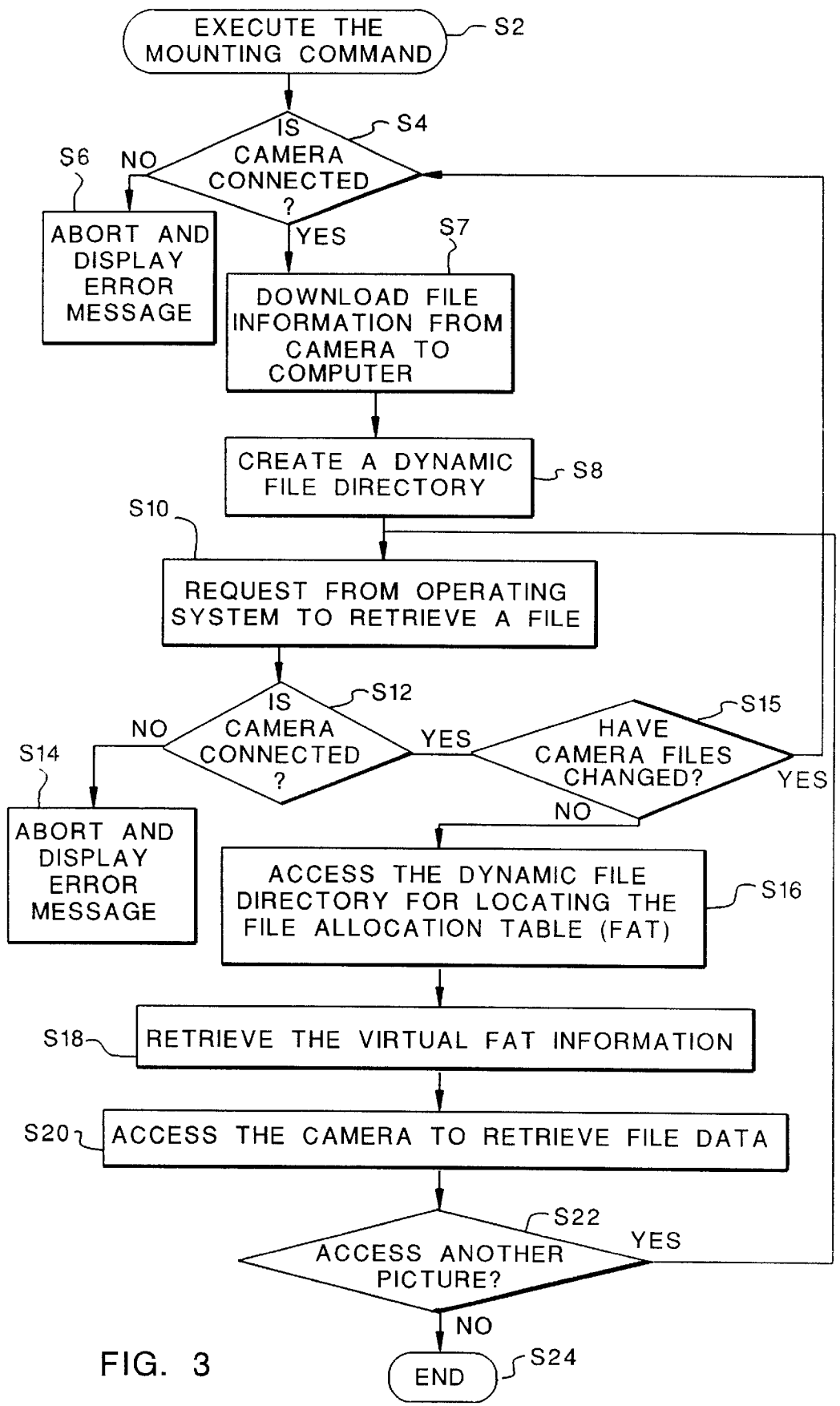
FIG. 3 is a flowchart of a software program of the present invention.

Referring to FIG. 3, there is illustrated a flowchart of a software program of the present invention which is permanently stored in memory 92 and is loaded, when the computer is booting, by the operating system into RAM 91. The software program of the present invention is programmed as a disk device driver to the operating system; such device drivers provide controls to disk devices. A device driver is only activated when its corresponding device is accessed, and it interacts with the user through the operating system with the device. The present invention is also programmed so that a new drive letter that represents a disk drive for the camera to be connected is created when it is loaded into memory at the time of booting. Until the camera is mounted or connected to the microprocessor-based unit 20, the contents of the drive representing the camera is empty. At the time of booting, the operating system loads all device drivers into the memory 91, and they reside in the memory 91 until the operating system is deactivated.

However, before discussing the software program further, it is instructive to note that the memory 91 in the computer is programmed by the present invention to allocate a predefined portion of its memory 91 for a dynamic file directory, which will be discussed in detail below. Referring briefly to FIG. 4, the dynamic file directory 120 is partitioned into a plurality of blocks 130 of 32 byte each for permitting each block 130 to be later populated with data for each particular picture.

Referring back to FIG. 3, the software program is initiated by executing a command for "mounting" or installing S2 the camera 70 as a disk drive, and it then verifies whether the camera 70 is physically connected S4 to the personal computer 10. If the camera 70 is not connected, the program directs the operating system to prompt an error message which is created S6 on the display 30 for informing the user that the camera 70 needs to be connected.

If the camera 70 is connected, the image name, data and time of capture, and the size of each image are downloaded S7 from the memory 62 of the camera 70 in a pre-allocated portion of computer memory 92. This downloaded information is stored sequentially S8 in the dynamic file directory 120 by the software.

Figure 5:
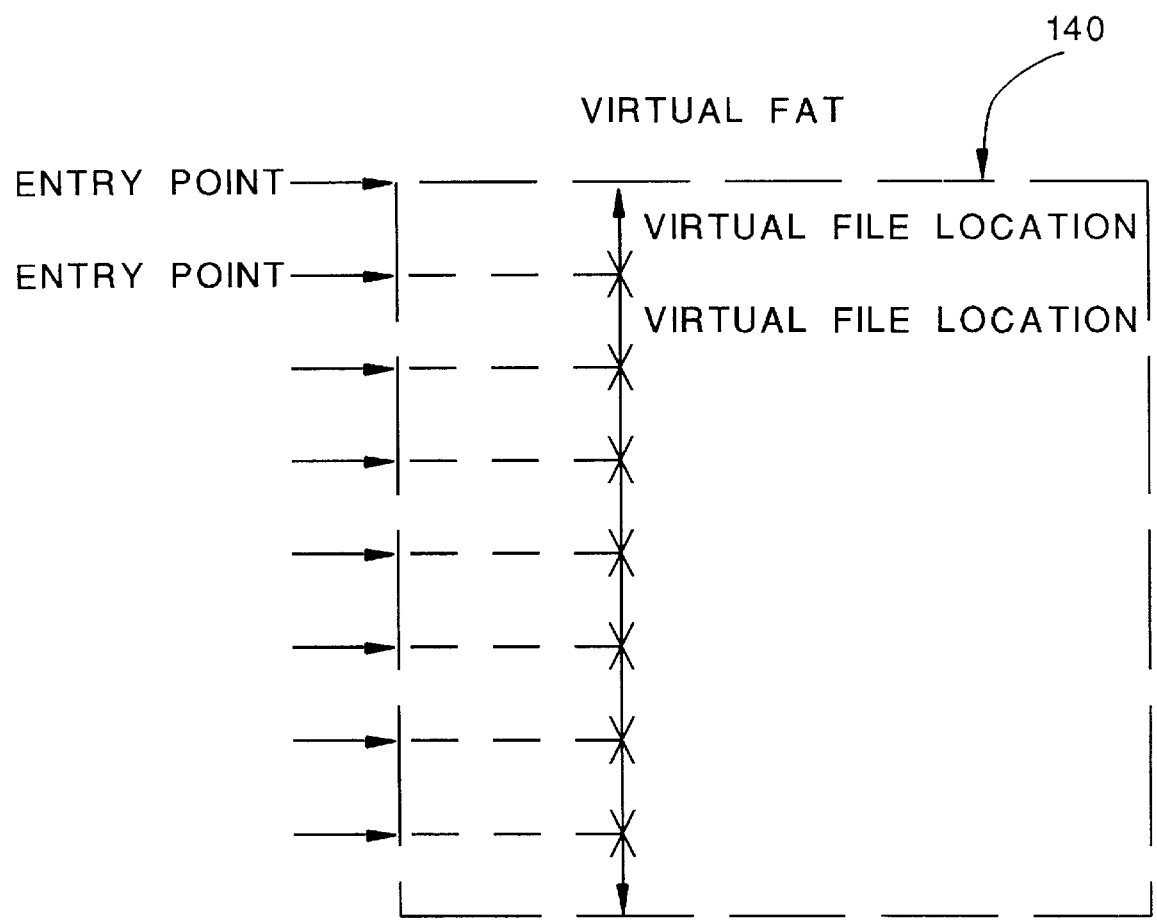
FIG. 5 is a diagram of a virtual file directory.

When the operating system tries to access a file, the software then calculates a virtual file allocation table (virtual FAT). The software starts to calculate a virtual file allocation table (i.e., virtual FAT) entry point on-line, by the below-described procedure, for simulating an actual entry into a virtual FAT 140 (FIG. 5). As previously stated, a FAT is an indexing system which correlates a physical memory location to a FAT entry point, or location in FAT in which the physical memory location is stored. However, the present invention does not actually have a FAT entry point or a physical memory location for the FAT entry point because the camera is not a typical disk drive for which storage thereon causes the operating system to search for an available storage location on the specified drive, store the file therein, and then assign this location in the memory to the particular FAT entry point.

Referring to FIG. 5, the present invention actually calculates the data which composes a FAT online when data from the virtual FAT is requested by the operating system. From the data in the file directory 120, the procedure for generating the virtual FAT 140 includes computing the total-preceding file size by adding the file size for each picture that precedes the desired image; for example, if the fifth image is desired, the file size of all the first four images is the total-preceding file size. The beginning of the file for the desired image, the entry point in the virtual FAT, is then known due to the fact that it is located at the next memory location that is directly after the memory location corresponding to the total-preceding file size. The end of the file for the desired image is computed by adding the file size of the desired image to its beginning file location. Consequently, the precise file location (virtual file location) for the entire file is known for the virtual disk, the camera, if such files were actually stored on a typical disk drive.

Referring back to FIG. 3, when the user requests via the operating system for retrieval of a particular picture S10, picture 5 for the purpose of illustration. The program once again verifies that the camera is physically connected to the computer S12, and if it is not connected, the program is aborted, and an error flag is set so a corresponding error message will be displayed on the display to indicate the camera is not accessible. If the program continues, it checks S15 the file content for any changes. If it has changed, it goes to step S4 for including these recently captured pictures. If the file content has not changed, the operating system then searches S16 the dynamic file directory 120 for the requested file (i.e., picture 5 in this example) which, in turn, indicates a corresponding entry location in the virtual FAT 140 for that particular picture or file.

The operating system then requests the virtual FAT 140 to put the entire location of the desired file, or virtual file location (picture 5 in this example) in a portion of a storage device selected by the operating system; typically the operating system selects RAM 91. This virtual file location is calculated on-line via the virtual FAT 140, and it is sent to the memory location selected by the operating system. The operating system then retrieves S18 the calculated virtual file location from the designated portion of memory. The operating system then requests the disk driver, the software, to retrieve S20 the virtual file location which the software corresponds to a particular file. The software then requests this particular image from the camera 70 which the camera 70 can supply as is well known in the digital photographic industry. The data for the desired image is then transferred to the operating system which displays it on the monitor 30. The above-described procedure is repeated S22 for retrieving any of the pictures stored in the memory of the camera. The program is terminated S24 when the microprocessor-based unit 20 is deactivated.

It is instructive to note that since the camera can be connected or and disconnected from an online computer, its memory content may vary every time it is connected to the computer. The file directory and the virtual FAT 140 are dynamically re-created due to the fact that the camera 70 image list is re-loaded whenever a re-connection or file content change is detected to include recently captured pictures as the flowchart illustrates.

The invention has been described with reference to a preferred embodiment. However, it will be appreciated that variations and modifications can be effected by a person of ordinary skill in the art without departing from the scope of the invention.

Parts List
  10 computer system
  20 microprocessor-based unit
  30 display
  40 keyboard
  50 mouse
  52 selector
  55 CD-ROM
  56 printer
  61 floppy disk
  62 memory
  70 camera
  75 serial port
  76 cable
  80 CCD
  90 pixels
  91 RAM
  92 memory
  95 image
  120 dynamic file directory
  140 virtual FAT

I claim:

1. A digital photographic system comprising:

(a) a digital camera having memory for storing digital images captured by the camera;

(b) a personal computer having an operating system and a communication port;

(c) means, disposed in said personal computer, for accessing the memory in the digital camera through the communication port to make the memory appear as a disk to the operating system; said accessing means including a dynamic file directory for accessing and retrieving a file size from the memory, and a virtual file allocation table for indicating virtual captured image location computed from the file size retrieved by the dynamic file directory for creating the appearance of a file allocation table, which stores a location of recorded datum for ultimately permitting said operating system to access the captured images, wherein the virtual file allocation table includes correlating captured image location to a captured image by adding each file size corresponding to a captured image that precedes a desired image to be retrieved for determining the captured image location.

2. The digital photographic system as in claim 1, wherein said operating system is DOS-based or point-and-click based.

3. The digital photographic system as in claim 2, wherein the dynamic file directory is re-created upon retrieving a number of captured images and the file size so as to include each captured image.

4. The digital photographic system as in claim 3, wherein the virtual file allocation table is calculated by a code executable by said personal computer.

5. The digital photographic system as in claim 4, wherein the dynamic file directory is created by a code executable by said personal computer.

6. A method for accessing data of a digital camera from a personal computer having a disk operating system and a communication port, the method comprising the steps of comprising:

(a) accessing memory in the digital camera through the communication port of the personal computer to make the memory appear as a disk to the operating system;

(b) creating a dynamic file directory for accessing and retrieving a file size from the memory of the digital camera;

(c) providing a virtual file allocation table for indicating a virtual captured image location in the memory computed from the file size retrieved by the dynamic file directory for creating the appearance of a file allocation table, which stores a location of stored datum for ultimately permitting the operating system to access the captured images; and (d) correlating virtual disk image file location to a correct captured image in the camera by matching location information provided by the virtual disk with entries in the dynamic file directory so that the desired image is retrieved.

7. The method as in claim 6 further comprising providing both a DOS-based or point-and-click based operating system.

8. The method as in claim 7 further comprising re-creating the dynamic file directory upon retrieving the number of captured images and the file size so as to include each captured image.

\* \* \* \* \*

UNITED STATES PATENT AND TRADEMARK OFFICE
CERTIFICATE OF CORRECTION

PATENT NO. : 5,848,420
DATED : December 8, 1998
INVENTOR(S) : Lin Xu

It is certified that error appears in the above-identified patent and that said Letters Patent is hereby corrected as shown below:

ON TITLE PAGE;
Item [54] and column 1, lines 1-3

-- VIRTUAL FILE ALLOCATION TABLE AND DYNAMIC FILE DIRECTORY FOR ACCESSING DATA IN THE MEMORY OF A DIGITAL CAMERA FROM A PERSONAL COMPUTER DIRECTLY THROUGH A SERIAL COMMUNICATIONS PORT --

Signed and Sealed this

Tenth Day of August, 1999

Attest:

Attesting Officer

Q. TODD DICKINSON

Acting Commissioner of Patents and Trademarks